Jan. 8, 1929.

W. H. TOBEY 1,698,035

BELT

Filed Dec. 20, 1927

INVENTOR
Walter H. Tobey
BY
Busser & Harding
ATTORNEYS.

Patented Jan. 8, 1929.

1,698,035

UNITED STATES PATENT OFFICE.

WALTER H. TOBEY, OF UPPER DARBY, PENNSYLVANIA, ASSIGNOR TO MAIN BELTING COMPANY, OF PHILADELPHIA, PENNSYLVANIA, A CORPORATION OF PENNSYLVANIA.

BELT.

Application filed December 20, 1927. Serial No. 241,432.

This invention relates to an improvement in belts, and more particularly relates to a belt adapted for conveying relatively hot materials.

Conveyor belts adapted for the transportation of hot materials are desirably faced with heat resistant material as asbestos. Because of the cost, however, and also because of the relative weakness of asbestos, it is customary, instead of making such belts entirely of asbestos, to form the body thereof of a number of plies of fabric, such as canvas, and to face the belt with asbestos, the facing and plies of canvas being secured together by parallel rows of stitching running longitudinally of the belt. In such belts, it has been found that the asbestos facing ply and especially the central portion thereof, wears through in a short time and the stitches holding the plies together burn through, with the result that the belt as a whole becomes useless.

Now the object of the present invention is the production of an asbestos faced belt which will have greater resistance to wear and heat than such belts as heretofore produced.

In the drawing:—

At 2 there is indicated the fabric portion of a belt which may be constructed in any desired manner, for example, by folding a single piece of canvas, or the like, to form a plurality of plies, or by covering a number of separate plies of canvas or the like with a covering, and it will be understood that asbestos plies may be incorporated in this fabric portion of the belt without departing from the spirit of the invention. The plies of the fabric portion are, as shown, secured together by lines of stitching 4, running longitudinally of the belt adjacent the edges thereof.

Figure 1:
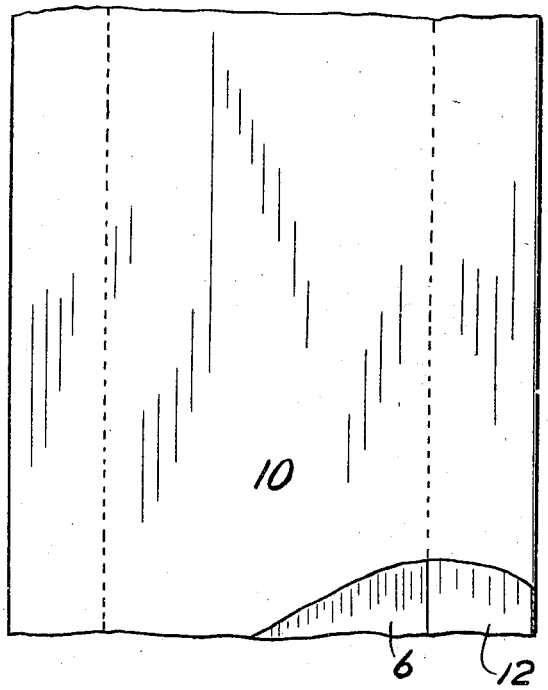
Fig. 1 is a plan view partially broken away of the improved belt.
Figure 2:
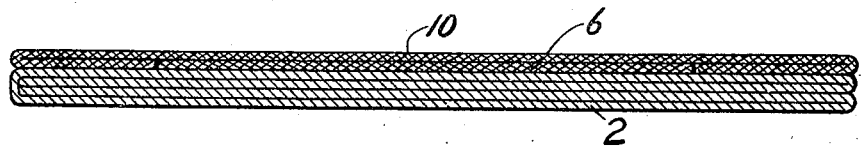
Fig. 2 is a sectional view taken transversely of the belt.
Figure 3:
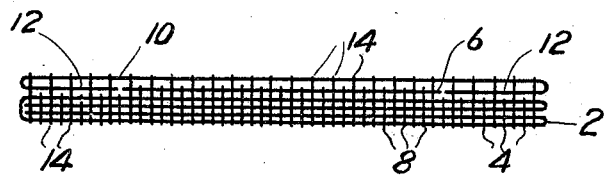
Fig. 3 is a diagrammatic sectional view showing the disposition of the various plies and their connecting stitches.

Superimposed upon the fabric portion 2 of the belt is a relatively narrow ply 6 of asbestos which is secured to the fabric belt by stitches 8. It will be understood that the fabric portion 2 may be stitched throughout its width prior to the superposition of the intermediate asbestos ply 6, or that the stitches 8 which secure the asbestos ply 6 to the fabric portion, may also serve to secure the central portions of the plies of the fabric portion to each other. Above the intermediate ply 6 there is located a facing ply 10 of asbestos, the edges 12 of which are inturned as shown in Figs. 1 and 3, and lie in the plane of the intermediate ply 6, thus providing a cover for the edges of the intermediate ply and also finished edges for the face ply. Ply 10 is secured by longitudinally disposed lines of stitches 14, which are stitched through the entire structure of the belt.

It will be observed that by the construction described, a belt is provided in which, if the facing layer of asbestos is destroyed, there is provided an intermediate ply of asbestos to prevent contact of hot materials with the destructible fabric portion. Also, upon the destruction of the exposed stitches 14, the intermediate ply 6 of the belt is not left devoid of attachment to the fabric portion, since it is secured to the fabric portion independently of the facing ply by means of stitches 8.

The belt may, of course, be impregnated with oils or bituminous compositions or the like, as is customary in the manufacture of belting of this character.

What is claimed is:—

1. A belt comprising a plurality of plies of fabric stitched together longitudinally adjacent their edges, a relatively narrow ply of asbestos superimposed on and extending longitudinally of the central portion of said fabric plies and stitched thereto by stitches extending through the fabric portion and a second ply of asbestos superimposed on said first mentioned asbestos ply and having its edge portions turned under, said second ply of asbestos being secured by stitches passing through the first asbestos ply and said fabric plies.

2. A belt structure including a body portion composed of a plurality of plies of fabric, a filler ply of asbestos of a width less than the body portion and superimposed longitudinally on the body portion with its edges spaced from the edges of the body portion and a surfacing ply of asbestos of greater width than the filler ply superimposed longitudinally on said filler ply and having its edge portions turned under and superimposed on the body portion in the plane of the filler ply, the several plies being secured together by stitching.

3. A belt structure including a body portion composed of a plurality of plies of fabric, a filler ply of asbestos of a width less than the body portion and superimposed longitudinally on the body portion with its edges spaced from the edges of the body portion and a surfacing ply of asbestos of greater width than the filler ply superimposed longitudinally on said filler ply and having its edge portions turned under and superimposed on the body portion in the plane of the filler ply, the several plies being secured together by stitching and the plies of the body portion being secured together by stitching independent of the stitching securing the several plies together.

4. A belt structure including a body portion composed of a plurality of plies of fabric, a filler ply of asbestos of a width less than the body portion and superimposed longitudinally on the body portion with its edges spaced from the edges of the body portion and a surfacing ply of asbestos of greater width than the filler ply superimposed longitudinally on said filler ply and having its edge portions turned under and superimposed on the body portion in the plane of the filler ply, the several plies being secured together by stitching, the plies of the body portion and the filler ply and body portion respectively being secured together by stitching independent of the stitching securing the several plies together.

In testimony of which invention, I have hereunto set my hand at Philadelphia, Pennsylvania, on this 16th day of December, 1927.

WALTER H. TOBEY.